United States Patent

[11] 3,602,251

[72] Inventor John Carroll Hill
 Rochester, Mich.
[21] Appl. No. 843,511
[22] Filed July 22, 1969
[45] Patented Aug. 31, 1971
[73] Assignee Standard International Corporation
 Andover, Mass.

[54] FLUENT MATERIAL LEVEL CONTROL SYSTEM
 10 Claims, 2 Drawing Figs.
[52] U.S. Cl. .................................................. 137/392,
 317/DIG. 3, 324/65 P
[51] Int. Cl. ..................................................... F16k 21/18
[50] Field of Search ............................................ 137/386,
 387, 392; 340/244, 244 C

[56] References Cited
UNITED STATES PATENTS
| | | | |
|---|---|---|---|
| 3,279,379 | 10/1966 | Klyce | 340/244 C UX |
| 3,496,380 | 2/1970 | Jones | 137/392 X |
| 3,509,825 | 5/1970 | Sorensen | 137/392 X |

Primary Examiner—Alan Cohan
Assistant Examiner—David R. Matthews
Attorney—Joseph Weingarten

ABSTRACT: A system for detecting, indicating and controlling the level of a fluent material in a container. This system applies alternating current to two electrodes in a container, the electrically conducting paths through the electrodes to the container being included in a voltage divider network. A solid-state circuit controls a pump and motor in response to the output of the voltage divider network to regulate the level of the material in the container.

FIG. I

INVENTOR.
JOHN CARROLL HILL
ATTORNEYS

FLUENT MATERIAL LEVEL CONTROL SYSTEM

FIELD OF THE INVENTION

This invention relates in general to a level detection, indication and control system and more particularly concerns a solid-state electronic system for regulating the level of a material within a container to maintain the material level between two predetermined values.

DISCUSSION OF THE PRIOR ART

Measurement of material level is commonly accomplished by any one or a combination of several means. Such measurement means may include ultrasonic, radiation, potentiometric, capacitance, or float-operated systems. The output of these measurement systems may be used with electrical, mechanical, pneumatic or hydraulic means or a combination of these to provide indication of level and to control the level of the material being measured through actuation of a pump or of some other level-adjusting device.

A significant drawback to several of the prior art devices is that they depend upon moving parts or complex electronic equipment or both with resulting high production costs and low reliability over long periods of operation. Use of such devices for consumer market applications, such as the control of the liquid level in a soft drink carbonator, has been generally unsatisfactory due, among others, to the above-enumerated disadvantages.

One system which has enjoyed some measure of success for such consumer market applications employs an electromechanical relay and associated moving contacts in conjunction with two electrodes immersed in the liquid. A significant drawback of this device is the use of the moving parts associated with the electromechanical relay. Some similar devices using immersed electrodes have suffered from the fact that direct current is used on the electrodes resulting in their corrosion due to electrolysis, causing the eventual destruction of the system.

SUMMARY OF THE INVENTION

Broadly speaking, the present invention comprises a solid-state electronic level control system having an operating life of several years with high reliability through several million operating cycles. The system includes a voltage divider network including two electrodes suspended at different levels within a container having an electrically conductive wall in contact with the material therein. The material whose level is to be controlled may be liquid or solid, the only requirement being that it be electrically conductive and readily flowable. The material will be generally referred to herein as a liquid. An alternating current is applied to the voltage divider network which includes the electrodes and the container having liquid therein. The alternating current output of the voltage divider network is rectified and filtered and applied to the input of a threshold detector such as a Schmitt trigger. This detector circuit responds to certain levels of input voltage to govern the operation of a power control device which is connected across the input powerline and which in turn controls the power applied to a load. Such a power control device may be a triode AC switch, commonly referred to as a triac, or a bidirectional silicon controlled rectifier. The load, which may be a motor and pump, or simply a valve-controlling device, controls the supply of liquid to the container to thereby maintain the level of the liquid in the container between two predetermined values.

The level control system constructed according to the principles of this invention has several advantages over the prior art. It is all "solid-state" so there are no moving parts to wear out and no relay contacts with their concomitant physical contact and arcing problems. With alternating current applied to the electrodes, no electrolysis-caused corrosion of the electrodes occurs, even during extended operating periods. Only a small voltage exists in the liquid between the electrodes and the container wall and the output of the voltage divider network is also small. However, these small voltages whose magnitudes are dependent upon liquid level are used to control full line voltage to the load. Furthermore, the invention is substantially immune to most line voltage fluctuations. This system is so constructed that small differences in the output voltage of the voltage divider network caused by intermediate changes in the level of the liquid do not affect the operation of the system. Furthermore, the sensitivity of the system need not be exceptional because it is intended to react only to widely separated voltage levels. The use of such unambiguous signals results in a highly stable and reliable system.

Although this system is useful for many purposes, it is specifically applicable to beverage-vending machines using carbonated water. Further, the unique circuit disclosed may be used for indicating high and low liquid levels if desired, rather than controlling the liquid to maintain it between two specified levels.

BRIEF DESCRIPTION OF THE DRAWING

A complete understanding of the invention and its features and advantages will become apparent from the following detailed description taken in conjunction with the accompanying drawing wherein.

DESCRIPTION OF THE PREFERRED EMBODIMENT

Figure 1:
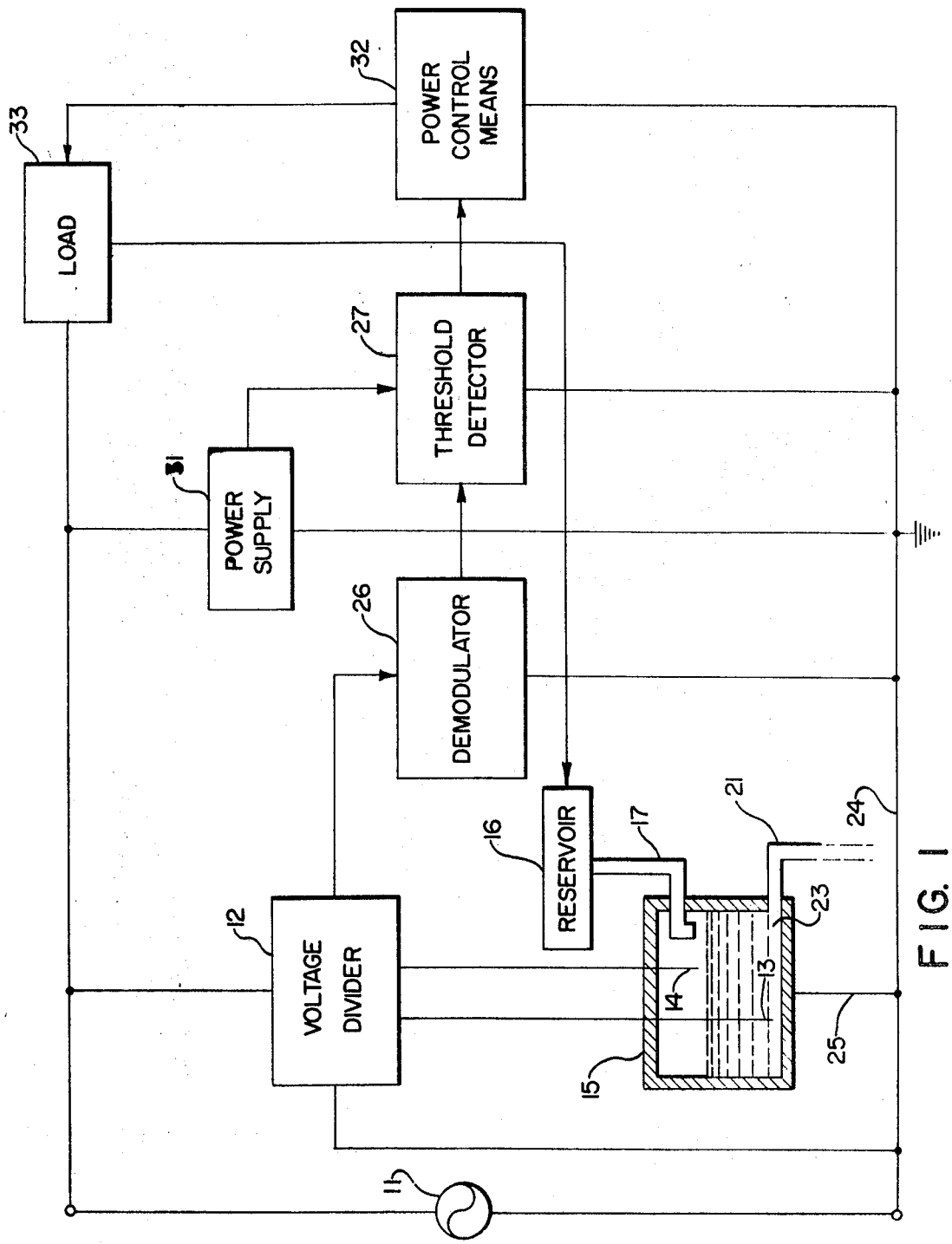
FIG. 1 is a block diagram of a system constructed in accordance with the principles of this invention.

With reference now to the drawing and more particularly to FIG. 1 thereof, there is shown a block diagram of a level control system powered by a conventional source of alternating current such as common 115 v., 60 Hz. electrical power, as indicated by power source 11. Voltage divider 12 includes the effective impedances of liquid 23 between the walls of container 15 and electrodes 13, 14. Container 15 is conventionally connected to a fluid reservoir 16 by supply pipe 17 and has an outlet 21 for supplying fluid to other apparatus, not shown. Fluid 23 within container 15 is electrically conductive, as are the inner surfaces of the walls of the container, which are connected to the common, or ground, line 24 by means of conductor 25. It is thus evident that the input to voltage divider 12 is an alternating voltage as is the potential between electrodes 13, 14 and container 15. The output of voltage divider 12, which is also an alternating voltage, is applied to a filtered rectifier or demodulator circuit 26. The output of the demodulator is a direct current voltage proportional to the peak output voltage of the voltage divider at any given time and is applied to a threshold detector circuit 27 which has hysteresis-type characteristics. The operating power for the detector circuit 27 is provided by power supply 31 which is also connected across the AC power source. The output of threshold detector 27 is then applied to a power control means 32 which is in series with load 33 across power source 11.

It can thus be seen from FIG. 1 that a relatively small voltage across electrodes 13, 14 in container 15 is used to vary the output of voltage divider 12 which indirectly controls the operation of load 33. Load 33 may be a motor and pump which in turn control the supply of liquid from reservoir 16 to container 15.

Figure 2:
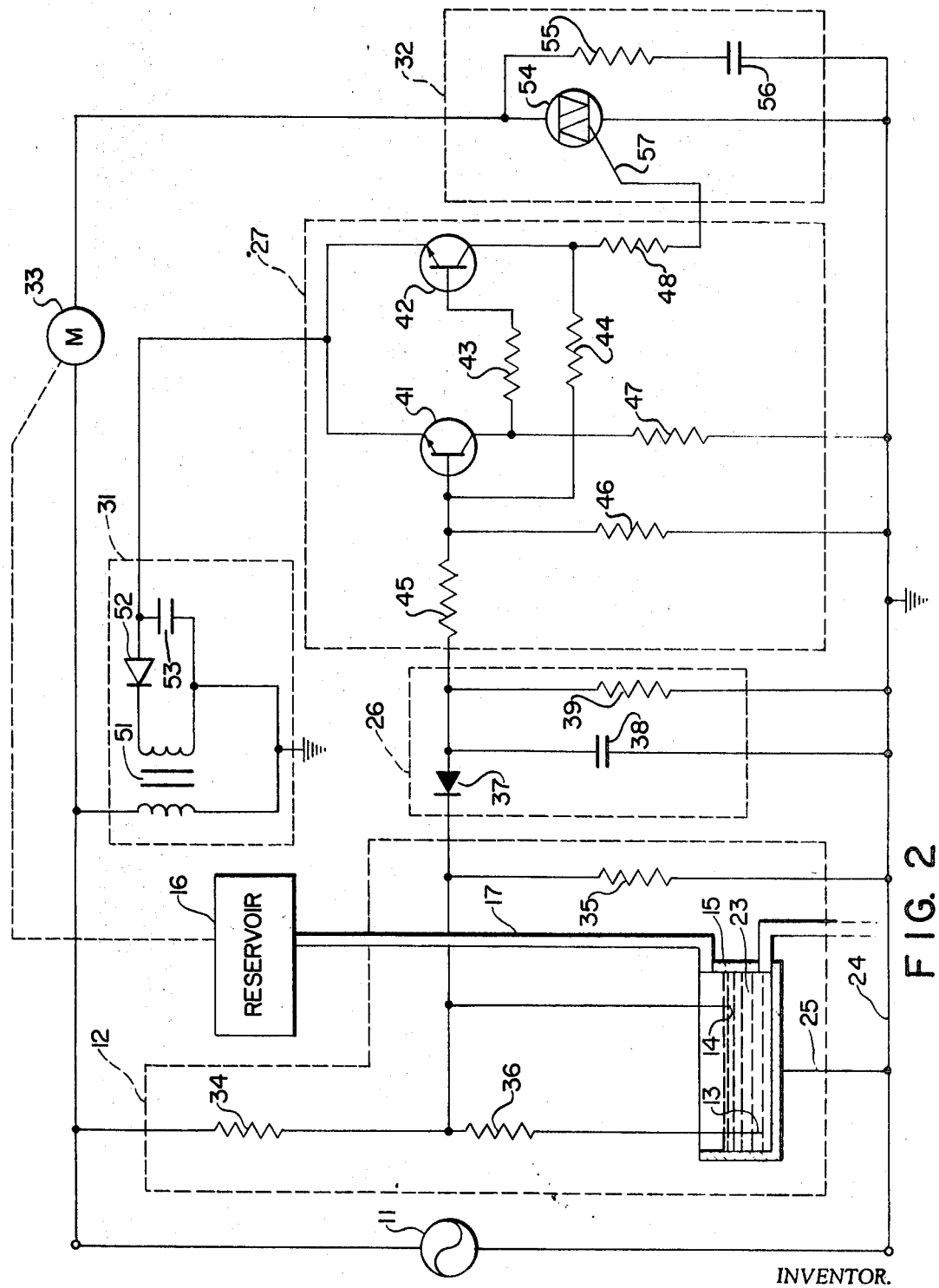
FIG. 2 is a schematic diagram of the system shown in FIG. 1.

The system of FIG. 1 is shown more specifically in the schematic of FIG. 2. Voltage divider 12 comprises resistor 34 in series with the remainder of the voltage divider network which comprises three parallel branches. One branch includes resistor 35, another branch includes an electrically conductive path through high level electrode 14 and liquid 23 to container 15, the third branch including a conductive path through resistor 36, low level electrode 13 and liquid 23 to container 15. With the output of voltage divider network 12 being taken across the above specified parallel combination, it is apparent that this output varies proportionally to the changes in output voltage of the network which occur as the level of liquid 23 rises or drops to cover or uncover the ends of electrodes 13, 14. This output voltage then becomes the input of demodulator 26.

Demodulator 26 is shown as a standard linear envelope detector comprising diode 37, capacitor 38 and resistor 39. The DC output of demodulator 26 is substantially proportional to the AC output of voltage divider 12 over the operating range of the system. The output voltage level of the voltage divider is low and the output of demodulator 26 is commensurately low. It will be recognized that since the output of the demodulator is applied to the base of a transistor in the threshold detector, its magnitude and the magnitude of the voltage changes need not be great, although the relative differences between the voltages may be significant.

The demodulator output voltage is applied to the input of the threshold detector 27 which is a modified, inverted, collector-base coupled binary, a type of Schmitt trigger having transistors 41, 42. The base of transistor 42 is coupled to the collector of transistor 41 through resistor 43 while the base of transistor 41 is coupled to the collector of transistor 42 through resistor 44. The threshold detector also includes resistors 45, 46, 47 and 48. As previously indicated, threshold detector 27 exhibits hysteresis, with the particularly hysteresis loop necessary for this operating sequence obtained by overcoupling the circuit. The degree of positive feedback, which is governed primarily by the choice of resistance values for resistors 44 and 45, determines the width of the hysteresis loop. Changes in the value of resistance of resistor 46 shifts the hysteresis loop between more positive or more negative input voltages without appreciably affecting the width of the hysteresis loop. Resistor 43 is primarily a current-limiting device to protect transistor 42 while resistor 47 is the collector load for transistor 41. Resistor 48 which is in the input circuit to power control means 32, is the collector load of transistor 42. Power supply 31 comprising transformer 51, diode 52 and capacitor 53 provides the common supply voltage level for the emitters of transistors 41 and 42. Power supply 31 is shown as a conventional DC power supply, but various other means may be used to provide the desired supply voltage to the transistors.

In order to further explain the property of hysteresis exhibited by threshold detector 27, it must be understood that the input voltage which triggers the circuit either on or off depends not only upon the value of that voltage, but also upon whether that voltage is increasing or decreasing. That is, when the threshold detector is off, the input voltage must rise to a certain predetermined level before the circuit is triggered into operation. If, after the circuit is turned on, the input voltage decreases to a value less than the predetermined triggering value, the threshold circuit remains in an ON condition until a second, lower predetermined voltage level is reached. The threshold circuit is then turned off and will not be turned on again until the first predetermined higher input voltage is again reached. This is standard operation for a Schmitt trigger and is more fully described in various textbooks such as *Pulse and Digital Circuits* by Millman & Taub (1956).

When threshold detector circuit 27 is in an ON condition, a signal, which may be termed a gating or indicating signal, is fed to power control means 32 through resistor 48. Power control means 32 may consist of a triac 54 shunted by the series combination of resistor 55 and capacitor 56. A triac is a semiconductor device often used for alternating current switching. This device is capable of switching large currents in response to relatively small input triggering voltages applied to gate 57. Because the load of motor 33 in series with power control means 32 is generally inductive, resistor 55 and capacitor 56 are necessary to protect triac 54 from voltage surges. It should be recognized that the power control means may alternatively comprise a pair of inverse parallel-connected silicon controlled rectifiers.

As shown in the drawing, motor 33 is used to control the supply of fluid from reservoir 16 to container 15 in some conventional way such as by means of a pump (not shown) located within, or connected to, reservoir 16. It should be noted that this system provides means for maintaining the liquid within the container between certain predetermined levels by means of a motor 33 and that the operational state of the motor does not depend uniquely upon material level, that is, when only the low level electrode is immersed, the motor may or may not run depending upon the most recent history of the liquid level. The hysteresis loop of the threshold detector prevents the motor from running each time fluid is drained from container 15 and provides for operation of the motor only when the fluid level reaches a certain predetermined low point and turns off the motor when the level has reached a predetermined high point. The length of time motor 33 operates during each cycle depends, of course, upon the size of the container and upon the capacity of the pump supplying fluid to the container.

The particular configuration of the level control system shown in the drawing has a very important advantage in that it is substantially immune to normal line voltage fluctuations with respect to its control operation. For example, if the line voltage increases, the demodulator output increases, providing an increase to the input of the threshold circuit. However, the threshold voltage applied to the emitters of transistors 41 and 42 by power supply 31 increases proportionately so that the trigger points of the hysteresis loop are substantially unchanged by such line voltage variations.

In order to further facilitate the understanding of this level control system, specific values will be given to some of the components shown in FIG. 2 so that ranges within which the circuit operates will be made clearer. It should be pointed out that the component values are approximate and that the components have normal tolerances. Further, the particular set of values provided are for purposes of example only, there being a wide variety of sets of values which may be used under different conditions and for somewhat different results.

In the voltage divider, resistor 34 has a value of 10,000 ohms, resistor 35 has a value of 5,600 ohms, resistor 36 has a value of 390 ohms and the resistance values between probes 13 and 14 through fluid 23 to the shell of container 15 are assumed to be 1,000 ohms each when the fluid is above a certain level and both electrodes are immersed in the fluid. In this example, the fluid is assumed to be carbonated water. In this condition, with a standard electrical power of 117 v. applied by AC source 11, the peak output voltage across resistor 35 will be approximately 8.15 v. When the fluid level decreases so that only electrode 13 is immersed, the peak output voltage of the voltage divider becomes approximately 16.5 v. When level of fluid 23 drops below a certain level so that both electrodes are dry, the peak output voltage becomes approximately 59.3 v. From this data it is evident that there need not be concern with minor differences in effective output impedance of the voltage divider since the threshold circuit may be constructed so that it is sensitive to only widely separated values of input voltage and is not affected by relatively minor variations from these predetermined levels.

In the demodulator, diode 37 is a standard small signal diode, capacitor 38 is a 50μf. capacitor and resistor 39 is a 10,000 ohm resistor. In order to fully explain the function of resistor 39, it is necessary to consider, in part, power supply 31 and threshold detector 27. Power supply 31 is a conventional circuit and is constructed to hold the emitters of transistors 41 and 42 (typical production transistors) at some specific voltage level, taken here for purposes of this example to be −9.3 v. With the base-to-emitter voltage of transistor 41 being typically small, the omission of resistor 39 would allow the −9.3 v. DC level of the emitter to back-bias diode 37, thereby maintaining the voltage at the output of demodulator 26 equal to or less than −9.3 v. The result is, of course, that threshold detector 27 would not operate as desired, triggering on and off at entirely different points in the cycle. However, resistors 39 and 45 act together as a voltage divider with the result that the output of demodulator 26 is proportional to the AC output of voltage divider 12. In response to the conditions previously specified for a voltage divider 12, the output of demodulator 26 will be approximately −2.8 v. with both electrodes immersed, −7 v. with the low electrode only immersed and −12 v. with neither electrode immersed. It is thus apparent that resistor 39 assists in keeping the output voltage levels of demodulator 26 well separated as well as preventing threshold detector 27 from back-biasing diode 37.

The function of threshold detector 27 is to translate the voltage levels of the output of demodulator 26, which depends upon the liquid level in container 15, into signals for controlling the operation of motor 33. As previously noted, the operational state of the motor does not depend uniquely upon liquid level, because if only the low electrode is immersed in liquid 23, it is not clear whether the motor should run or not. Threshold detector 27 therefore must provide the proper signals so that if both electrodes are dry, the motor should start and run until both electrodes are immersed when it will be turned off. Once off, the motor will not restart until both electrodes again are dry. As previously stated, the width of the hysteresis loop of threshold detector 27 depends upon the value of resistors 44 and 45 which are here taken to be 22,000 ohms each. The position at which threshold detector 27 triggers with respect to the value of input voltages is dependent upon the resistance value of resistor 46 which is here taken to be 56,000 ohms. With the component values given, detector 27 will trigger ON when the input voltage from demodulator 26 is approximately −9 v. and will trigger OFF when the input voltage reaches −4 v.

It should be understood that the value of the output voltage of threshold detector 27 is not dependent upon the value of the input voltage from demodulator 26, but that the value of the input voltage determines whether or not detector 27 is conducting.

In following a cycle of operation of the liquid level control system described herein, the starting point is assumed to be with threshold detector 27 OFF and container 15 full so that the output voltage of demodulator 26 is at the minimum level of −2.8 v. As fluid level within container 15 decreases, the voltage level output of demodulator 26 decreases, that is, the absolute value of the voltage increases in a negative sense. As the fluid level decreases, the voltage decreases from −2.8 to −7 v. when electrode 14 is no longer immersed in liquid 23. Threshold detector 27 and power control means 32 are still off. Further reduction in liquid level uncovers low electrode 13, causing the voltage of the threshold detector to drop below −9 v. At this point the voltage on the gate 57 of triac 54 drops to −9.3 v. as the threshold circuit triggers, thereby triggering the triac and turning on motor 33. Shortly thereafter, low electrode 13 becomes covered with liquid and the input voltage to the threshold detector 27 increases to −7 v. However, due to the feedback arrangement of the threshold detector circuit, this circuit remains ON and motor 33 continues to run. As the liquid touches the high level electrode, the input voltage to threshold detector 27 increases to −2.8 v., thereby exceeding the trigger level of −4 v. for detector 27. Threshold detector 27 is turned off, the voltage on triac gate 57 increases to 0, and motor 33 is turned off.

By proper selection of resistance values for the various resistors in the system, the output voltage levels for demodulator 26 may be kept well separated and the threshold detector made to operate within the desired limits. It should be remembered that the operation described with particular values of circuit components is an example only and that wide variations in component values and in the components themselves are allowable within the principles of the invention herein disclosed.

What I claim is:

1. Apparatus for controlling the level of a fluent material in a container, said apparatus comprising:

means for applying alternating electrical power to said apparatus;

a variable impedance voltage divider network connected directly across said electrical power-applying means, said voltage divider network including:

said container;

the fluent material within said container;

a plurality of electrodes located within said container at spaced levels; and at least one resistor; the electrical signal output of said voltage divider network being uniquely dependent upon the level of the fluent material in said container;

a demodulator circuit connected to said voltage divider network to convert the alternating current output signals thereof to direct current signals;

a threshold detector for generating first and second indicating signals responsive to the direct current output signals of said demodulator circuit, said first and second indicating signals being nonuniquely dependent upon the level of the fluent material in said container;

means for producing control signals in response to said first and second indicating signals; and means responsive to said control signals for adjusting the level of the fluent material in said container;

said control signal-producing means and said level-adjusting means being connected in series across said electrical power applying means.

2. The apparatus recited in claim 1, wherein:

said control signal-producing means includes a triode AC switch in series with said fluent material level-adjusting means across said electrical power-applying means, said triode AC switch being turned on in response to said first indicating signal to thereby cause said level-adjusting means to operate, and being turned off in response to said second indicating signal to thereby inhibit operation of said level-adjusting means.

3. The apparatus recited in claim 1, wherein:

said electrodes are two in number, the first electrode being suspended within said container adjacent the bottom thereof, the second electrode being suspended within said container adjacent the top thereof.

4. The apparatus recited in claim 1, wherein:

said threshold detector has a predetermined hysteresis characteristic whereby said first indicating signal is produced when the fluent material in said container is below a first predetermined level and said second indicating signal is produced when the fluent material in said container is above a second predetermined level higher than said first predetermined level, one of said first and second indicating signals being produced by said threshold detector when the fluent material is between said first and second predetermined levels, the determination of the indicating signal to be produced being dependent upon the immediate past history of the level of the fluent material in said container.

5. The apparatus recited in claim 4, wherein:

said threshold detector produces said first indicating signal when the fluent material is between said first and second predetermined levels immediately after having been below said first predetermined level, and produces said second indicating signal when the fluent material is between said first and second predetermined levels immediately after having been above said second predetermined level.

6. The apparatus recited in claim 4 and further comprising a power supply connected to said electrical power-applying means, said power supply providing operating power voltages to said threshold detector.

7. The apparatus recited in claim 6, wherein:

said threshold detector comprises;

a first transistor having its base coupled to the output of said demodulator circuit;

a second transistor having its base coupled to the collector of said first transistor, the base of said first transistor being coupled to the collector of said second transistor, the output of said power supply being coupled to the emitters of both said first and second transistors;

the collector of said second transistor being coupled to said control signal-producing means.

8. Apparatus for indicating changes in the level of a fluid within a container, said apparatus comprising:
   means adapted for applying alternating electrical power to said apparatus;
   a variable impedance voltage divider network connected directly to said electrical power-applying means, said voltage divider network including;
   said container;
   the fluent material within said container;
   a plurality of electrodes located within said container at spaced levels; and
   at least one resistor; the electrical signal output of said voltage divider network being uniquely dependent upon the level of the fluent material in said container;
   a demodulator circuit connected to said voltage divider network to convert the alternating current output signals thereof to direct current signals;
   a threshold detector for generating first and second indicating signals responsive to the direct current output signals of said demodulator, said first and second indicating signals being nonuniquely dependent upon the level of the fluent material in said container.

9. The apparatus recited in claim 8 and further comprising a power supply connected to said electrical power-applying means, said power supply providing operating power voltages to said threshold detector.

10. The apparatus recited in claim 8, wherein:
   said demodulator circuit and said voltage divider network having mutually proportional output signals, the value of said output signals being dependent upon the level of fluent material within said container, said output signals having a first predetermined value determined by a first predetermined level of the fluent material, a second predetermined value determined by a second predetermined level of the fluent material and a third predetermined value intermediate said first and second predetermined values and when the level of the fluent material is between said first and second predetermined levels;
   said threshold detector producing said first indicating signal in response to the signal of first predetermined value from said demodulator circuit and thereafter continuing to produce said first indicating signal when the level of the fluent material changes from said first predetermined level and until said level reaches said second predetermined level, said threshold detector producing said second indicating signal in response to said signal of second predetermined value from said demodulator circuit and thereafter continuing to produce said second indicating signal when the level of the fluent material changes from said second predetermined level and until said level reaches said first predetermined level.